United States Patent [19]

Bosquain et al.

[11] Patent Number: 5,033,502
[45] Date of Patent: Jul. 23, 1991

[54] APPARATUS FOR SUPPLYING A GAS TO A GAS UTILIZING NETWORK

[75] Inventors: Maurice Bosquain, Sommecaise; Jean-Yves Lehman, Maisons Alfort, both of France

[73] Assignee: L'Air Liquide, Societe Anonyme Pour l'Etude et l'Exploitation Des Procedes Georges Claude, Paris, France

[21] Appl. No.: 549,940

[22] Filed: Jul. 9, 1990

[30] Foreign Application Priority Data

Jul. 19, 1989 [FR] France ............... 89 09695

[51] Int. Cl.⁵ .............................................. G05D 7/00
[52] U.S. Cl. ..................................... 137/334; 137/486
[58] Field of Search ............... 137/486, 487.5, 334, 137/340; 165/40

[56] References Cited

U.S. PATENT DOCUMENTS 3,862,644 1/1975 Emmons ..................... 137/486
4,506,594 3/1985 Rowland ................. 137/486 X
4,671,318 6/1987 Benson ....................... 137/486

FOREIGN PATENT DOCUMENTS 2352230 12/1977 France.
2381234 9/1978 France.
2136095 9/1984 United Kingdom.

Primary Examiner—Alan Cohan
Attorney, Agent, or Firm—Young & Thompson

[57] ABSTRACT

The gas which comes from a source passes through a regulating valve, then through a heat exchanger and is sent to the network through a production duct. The heat exchanger thus acts as a muffler. Application to the supplying of gas from air separation.

7 Claims, 1 Drawing Sheet

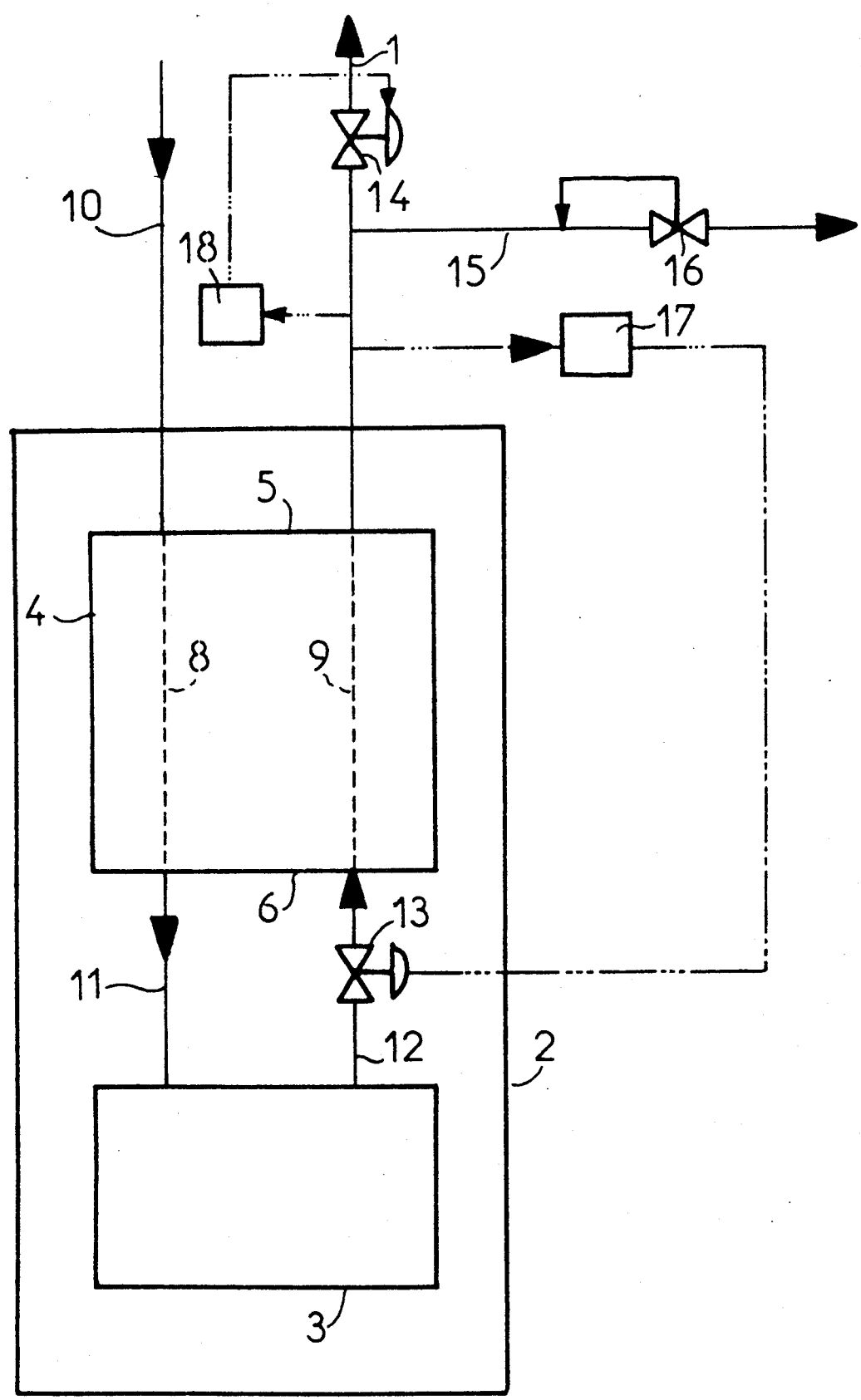

APPARATUS FOR SUPPLYING A GAS TO A GAS UTILIZING NETWORK

BACKGROUND OF INVENTION (a) Field of the Invention

The present invention concerns the supply of a gas to a gas utilizing network, this gas originating from a source of gas and passing through a heat exchanger before reaching the network. The invention applies for example to the case where the gas is produced in a cryogenic apparatus such as a double column for the distillation of air, and also to other processes which are used to produce gases at a temperature which is quite different from room temperature.

(b) Description of Prior Art

To be able to feed the network in a reliable fashion, the gas must be produced at a pressure slightly above the maximum pressure of the network, and consequently a certain expansion of the gas must be carried out in a throttle valve.

Now, the throttle valve is usually constituted of a so-called production valve which is found at the periphery of the apparatus, and the expansion produces a noise which radiates in the distribution collectors and is propagated in the stream of gas.

To reduce this noise, a muffler may be mounted downstream of the production valve. However such a muffler is itself responsible for a loss of charge which renders the apparatus more energy costly, and constitutes an additional investment and is cumbersome.

The invention aims at reducing the noise transmitted to the network without having to use a muffler.

SUMMARY OF INVENTION

For this purpose, it is an object of the invention to provide apparatus for supplying a gas to a gas utilizing a network, said gas originating from a source of gas and passing through heat exchanger before reaching the network, characterized in that the gas passes through a regulating throttle valve mounted upstream of the heat exchanger.

According to a particularly simple embodiment, said valve is regulated at a constant flow and the gas which is possibly in excess with respect to the demand of the network is diverted from the network.

The apparatus is of the type comprising a source of gas, a heat exchanger comprising passages for said gas, a duct for carrying gas from the source to the heat exchanger, and a production duct which connects the outlet of the exchanger to the network, and is characterized in that said carrying duct is provided with a regulating throttle valve.

The solution proposed is particularly efficient when the heat exchanger is of the plate type.

BRIEF DESCRIPTION OF DRAWINGS

An embodiment of the invention will now be described with reference to the annexed drawing, in which:

The single FIGURE is a schematic representation of an apparatus according to the invention.

DESCRIPTION OF PREFERRED EMBODIMENTS

The apparatus represented in the drawing is intended to supply a gas derived from air, which will be assumed to be nitrogen for the convenience of the description, to a gas utilizing network supplied by means of a production duct 1. The network is at a pressure slightly above atmospheric pressure; this pressure varies somewhat as a function of the demand, while remaining lower than a maximum set pressure, which for example will be assumed to be equal to 1.2 absolute bar.

The apparatus comprises a cold box 2 which is heat insulated and contains on the one hand a cryogenic device 3 for air separation, for example constituted of a double column for the distillation of air, and on the other hand a heat exchanger 4 of the plate type.

The heat exchangers of the plate type are known in the art of distilling air. They comprise a plurality of parallel aluminum plates which define therebetween flat passages of large dimensions in which the fluids which undergo heat exchange circulate, i.e. on the one hand the air being cooled down, and on the other hand the various gases produced by the apparatus, being heated. Each of the flat passages contains waves of aluminum defining braces and wings and is bound by vertical and horizontal bars. The heat exchanger assembly is assembled by oven brazing. It possesses an end 5, called hot end, whose temperature is near room temperature, and an end 6, called cold end, whose temperature is near the dewpoint of the compressed air to be separated.

For the purpose of the present description, only the heat exchanger, operating in countercurrent, between the air to be separated and the gas to be supplied to the network, i.e. nitrogen, will be considered. Thus, only passages 8 for cooling air and passages 9 for warming nitrogen have been represented in the drawings. A duct 10 for the supply of compressed air to be separated, from which water and $CO_2$ have been removed, is connected at the hot ends of the passages 8; a duct 11 connects the cold end of these passages 8 to the air inlet of the apparatus 3; a duct 12 connects the nitrogen outlet of the apparatus to the cold end of the passages 9; and the duct 1 is connected to the hot end of these passages 9.

The apparatus also comprises a regulating throttle valve 13 associated with the duct 12, and in addition to the cold box 2:

- a stop valve 14, called production valve, mounted on the duct 1;
- upstream of this valve, a duct 15 leading to the air, diverted from the duct 1 and provided with a valve 16; the latter operates as an overflow, i.e. as an upstream pressure regulator;
- a flow meter 17 measuring the flow of gas in the part of the duct 1 located upstream of duct 15 and controlling the valve 13; and
- an analyzer 18 of the nitrogen produced, which for example analyzes the composition of the gas which circulates in the duct 1, this analyzer controlling the valve 14.

Valve 16 is adjusted to open as soon as the pressure in the duct 15 exceeds a predetermined value which is equal to the maximum pressure of the network, for example 1.2 bar. The flow meter 17 compares the flow measured, to a predetermined value corresponding to the production of the apparatus 3 and controls the valve 13 so as to cancel the difference.

In normal operation of the apparatus, the exchanger 4 produces a small loss of charge, for example 0.1 bar. Nitrogen is produced by the apparatus 3 at a constant flow under a pressure slightly above the maximum pressure of the network, increased by this loss of charge, which is consequently slightly above 1.3 bar. This nitrogen has the required purity, and the analyzer 18 maintains the valve 14 open. The valve 13 is flow regulated from the signal given by the flow meter 17. so that the flow through this valve is constantly equal to the flow of nitrogen produced. Valve 16 remains closed and opens only if the pressure of the network reaches its maximum valve, to throw the excess nitrogen into the air.

In this situation, the expansion of nitrogen which is associated with the regulation of the flow is carried out in the cold valve 13, i.e. inside the heat insulation of the cold box. This ensures a first attenuation of the noise associated with the expansion. Moreover, the expanded gaseous stream passes through the exchanger 4, which itself acts as a muffler because of the very large surface of the nitrogen passages and the loss of charge which it necessarily creates to promote the heat exchange. Thus, a highly attenuated noise is heard outside of the installation and is transmitted to the network.

In the case of an occurrence leading to a degradation of the purity of nitrogen, the analyzer 18 causes the valve 14 to close, so that all the nitrogen produced is sent to the air by means of the duct 15. When the required purity is reached (case of starting up) or found again, the analyzer 18 re-opens the valve 14 or, as a variant, emits a signal authorizing the opening of this valve, the opening being carried out manually by an operator.

Thus, in all the situations, the apparatus will transmit to the network only a very attenuated noise. It is observed that the noise produced by contact with air, which is in any case generally not too disturbing, is also very attenuated since we are dealing with an already expanded gas which reaches valve 16. If desired, duct 15 can in any case be provided with a cheap muffler, which is not too cumbersome and involves no additional expense of energy.

We claim:

1. An apparatus for supplying a gas to a gas utilizing network, comprising a gas production device having a predetermined gas flow production rate, gas conduit means receiving product gas from said gas production device and adapted to deliver said product gas to a gas utilizing network, a heat exchanger in said gas conduit means, a regulating throttle valve in the gas conduit means between the gas production device and the heat exchanger, and a flow meter for sensing the flow of gas in the conduit means downstream of the heat exchanger, said flow meter being connected to the regulating throttle valve to control the flow of gas in the conduit means to match said predetermined gas flow production rate of the gas production device.

2. Apparatus as claimed in claim 1, wherein said gas production device is a cryogenic device separating the product gas from air.

3. Apparatus as claimed in claim 1, and a heat insulated enclosure which encloses said gas production device, said regulating throttle valve and said heat exchanger.

4. Apparatus as claimed in claim 1, and a stop valve in said gas conduit means, and a gas analyzer connected to said gas conduit means and connected to the stop valve to close the stop valve when the composition of product gas measured by the gas analyzer has less than a predetermined purity.

5. Apparatus as claimed in claim 4, and an overflow valve connected to said gas conduit means upstream of said stop valve for discharging said product gas above a predetermined pressure for which said overflow valve is set to open.

6. Apparatus as claimed in claim 1, said heat exchanger being of the countercurrent heat exchange type for exchanging heat between raw gas supplied to the gas production device and said product gas in said gas conduit means.

7. Apparatus for supplying a gas to a gas utilizing network, of the type which comprises a source of gas (3), a heat exchanger (4) including passages (9) for the gas, a duct (12) for carrying said gas from the source to the heat exchanger, and a production duct (1) which connects the outlet (5) of said passages of the heat exchanger to the network, said carrying duct (12) having a regulating throttle valve (13) that is regulated at a constant flow, and an outlet valve (16) connected to said production duct (1), the outlet valve operating as an overflow, the production duct (1) having a stopping valve (14) controlled by an analyzer (18) of the quality of the gas.

* * * * *